US012137694B2

(12) United States Patent
Bernhardt

(10) Patent No.: US 12,137,694 B2
(45) Date of Patent: Nov. 12, 2024

(54) DOUGH PORTIONING DEVICE

(71) Applicant: FRITSCH BAKERY TECHNOLOGIES GMBH & CO. KG, Markt Einersheim (DE)

(72) Inventor: Udo Bernhardt, Iphofen (DE)

(73) Assignee: Fritsch Bakery Technologies GmbH & Co. KG, Markt Einerscheim (DE)

( * ) Notice: Subject to any disclaimer, the term of this patent is extended or adjusted under 35 U.S.C. 154(b) by 0 days.

(21) Appl. No.: 17/709,466

(22) Filed: Mar. 31, 2022

(65) Prior Publication Data

US 2022/0312778 A1 Oct. 6, 2022

(30) Foreign Application Priority Data

Mar. 31, 2021 (DE) ......................... 102021108141.6

(51) Int. Cl.

*A21C 5/00* (2006.01)
*A21C 9/08* (2006.01)
*B65G 21/20* (2006.01)

(52) U.S. Cl.

CPC ................ *A21C 9/085* (2013.01); *A21C 5/00* (2013.01); *B65G 21/20* (2013.01)

(58) Field of Classification Search

CPC ........... A21C 9/085; A21C 5/00; A21C 5/006; A21C 3/04; A21C 9/08; A21C 11/10; B65G 21/20; B65G 15/08

See application file for complete search history.

(56) References Cited

U.S. PATENT DOCUMENTS

| | | | |
|---|---|---|---|
| 5,395,229 | A | 3/1995 | Atwood |
| 5,427,515 | A | 6/1995 | Muller et al. |
| 5,824,349 | A | 10/1998 | Muller |

(Continued)

FOREIGN PATENT DOCUMENTS

| | | | |
|---|---|---|---|
| DE | 697 04 058 | T2 | 6/2001 |
| DE | 10 2015 003 051 | A1 | 9/2016 |

(Continued)

OTHER PUBLICATIONS

JP-2006055120-A Description Machine Translation (Year: 2023).*

(Continued)

*Primary Examiner* — Farah Taufiq
*Assistant Examiner* — Anna J. Perkins
(74) *Attorney, Agent, or Firm* — Brooks Kushman P.C.

(57) ABSTRACT

A dough portioning device comprises a metering device with a container configured to receive a supply of dough, and a separator configured to separate a defined quantity of dough from the supply of dough and to discharge the quantity of dough at a discharge end of the metering device in a discharge direction. The dough portioning device furthermore comprises a conveyor device configured to transport dough in a conveying direction, wherein the conveyor device comprises a conveyor belt, and is arranged below the discharge end of the metering device. The conveyor device furthermore comprises a belt guide configured to bend/fold lateral sections of the conveyor belt relative to a middle section in a direction towards the metering device. The middle section of the conveyor belt has a declivity relative to the discharge end of the metering device, at least in a section in the region of the metering device.

23 Claims, 5 Drawing Sheets

1
2
4
5
6
10
11
20
21
15
9
3
16
14
18
19
F
A

(56) References Cited

U.S. PATENT DOCUMENTS

| | | | |
|---|---|---|---|
| 6,001,403 | A | 12/1999 | Kobayashi |
| 2021/0307337 | A1 | 10/2021 | Bernhardt |

FOREIGN PATENT DOCUMENTS

| | | | | | |
|---|---|---|---|---|---|
| DE | 102018117004 | A1 * | 1/2020 | ............... | A21C 3/00 |
| EP | 896514 | B1 * | 2/2001 | ............. | A21C 9/061 |
| EP | 3 066 928 | B1 | 8/2020 | | |
| JP | 2000-197443 | A | 7/2000 | | |
| JP | 2006055120 | A * | 3/2006 | | |
| WO | WO-9300817 | A1 * | 1/1993 | ............... | A21C 5/00 |

OTHER PUBLICATIONS

Bernhardt (DE102018117004A1) Espacenet English Translation (Year: 2023).*

Koenig (WO-9300817-A1) Google Patents English Translation (Year: 2023).*

European Search Report (with English Machine Translation), Dated Aug. 30, 2022, Application No. 22161526.3-1002, Applicant Fritsch Bakery Technologies Gmbh & Co. KG, 16 Pages.

German Search Report Dated Feb. 4, 2022, Application No. 10 2021 108 141.6, Applicant Fritsch Bakery Technologies GmbH & Co. KG, 5 Pages.

German Search Report Application No. 10 2021 108 141.6 Dated Feb. 4, 2022, Letter identifiers that indicate relevance of the cited documents (see p. 2 of the German Search Report).

DE 697 04 058 T2, U.S. Pat. No. 6,001,403.

DE 10 2015 003 051 A1, Abstract & Machine Translation.

DE 10 2018 117 004 A1, US 2021/0307337 A1.

Japanese Notification—Submission of Publications for Application No. 2022-051718, Dated Apr. 18, 2023, English Machine Translation (Notification—Submission of Publications).

JP 2000-197445 A, Abstract & Machine Translation.

Japanese Office Action (with English Machine Translation) Dated Mar. 14, 2023, Application No. 2022-051718, 10 Pages.

Japanese Notification—Submission of Publications (with English Machine Translation), Dated Apr. 18, 2023, Application No. 2022-051718, 14 Pages.

* cited by examiner

DOUGH PORTIONING DEVICE

CROSS-REFERENCE TO RELATED APPLICATIONS

This application claims foreign priority benefits under 35 U.S.C. § 119(a)-(d) to German patent application number DE 10 2021 108 141.6, filed Mar. 31, 2021, which is incorporated by reference in its entirety.

TECHNICAL FIELD

The disclosure relates to a dough portioning device.

BACKGROUND

Devices that deposit portions of dough on a conveyor belt are known from prior art. DE 10 2015 003 051 A1 discloses e.g., a bakery machine system for conveying dough and comprising a portioning device which pinches off individual portions of dough using so-called star rollers and lets them drop onto a conveyor belt device. In order to prevent particularly viscous doughs from flowing over the longitudinal side edges of the conveyor belt device, lateral upper layers which can be folded up are provided on the longitudinal side edges. These are folded up by support devices in order to thus obtain a trough-shaped cross section of the conveyor belt.

A further developed device is known from DE 10 2018 117 004 A1. Various types of optimization of the structure of the conveyor belt which are intended to improve folding of the side regions are described there.

Problems can arise when the pinched-off portions of dough drop down, in particular if the individual portions dropping down should overlap, which, firstly, can disrupt or even interrupt the production process and, secondly, can impair the quality of the dough being conveyed onward. The latter is all the more problematic as the portioning is conducted at the very beginning of the production process and any deterioration in the quality of the dough that has already occurred at this point can have negative effects on the entire subsequent production process.

SUMMARY

It is therefore an object of the disclosure to provide an improved dough portioning device. This object is achieved by a dough portioning device according to the disclosure.

The dough portioning device described herein comprises a metering device with a container which is configured to receive a supply of dough, and a separator which is used to separate a defined quantity of dough from the supply of dough and to discharge the quantity of dough at a discharge end of the metering device in a discharge direction. It furthermore comprises a conveyor device which is configured to transport dough in a conveying direction, comprises a conveyor belt, and is arranged below the discharge end of the metering device. The discharge end extends in the conveying direction over a discharge length from a section on the upstream side to a section on the downstream side, where the conveyor device furthermore comprises a belt guide which is configured to bend lateral sections of the conveyor belt relative to a middle section in the direction towards the metering device. The dough portioning device is characterized in that the middle section of the conveyor belt has a declivity relative to the discharge end of the metering device, at least in a section in the region of the metering device.

In particular in the case of overlapping quantities of dough, the declivity of the middle section in the region of the metering device can have the effect that a drop height difference between different portions of the quantity of dough can be reduced and/or compensated for, e.g., between a portion of the quantity of dough deposited on a preceding (i.e., overlapping) portion and a portion deposited directly on the conveyor belt, in particular on the middle section of the conveyor belt. Due to portions of the quantity of dough sticking to the metering device, it could conventionally happen that the quantity of dough deposited is undesirably twisted and/or folded if the drop heights differ too much. In the case of a strip of dough to be produced from several quantities of dough, this could lead to inhomogeneities which could make production more difficult and reduce the product quality. These problems, among others, are avoided with the disclosure.

The direction in which the quantity of dough moves out of the metering device can be regarded to be the discharge direction. With a horizontally oriented discharge end, the discharge direction can be oriented e.g., to be substantially vertical and/or transverse, preferably perpendicular, to the discharge end.

It can be advantageous if the discharge end is oriented to be substantially horizontal. In this way, gravity can best assist in discharging the quantity of dough However, embodiments are also conceivable in which the declivity of the middle section of the conveyor belt relative to the discharge end is achieved in that the latter is arranged at an angle to the horizontal and/or the middle section of the conveyor belt is oriented to be horizontal.

It is conceivable that the middle section can have a distance from the discharge end which, measured in the discharge direction, is variable along the conveying direction. In particular in cases in which the quantity of dough deposited is of larger quantity in the conveying direction than in a direction that is transverse, in particular perpendicular to the conveying direction, compensating for the difference in drop height in this direction can have a particularly advantageous effect.

In one variant of the dough portioning device, lateral edges of the lateral sections can each have a distance from the discharge end that is measured along the conveying direction and is substantially constant in the discharge direction. In particular, the lateral edges of the conveyor belt can be oriented parallel to the discharge end. As a result, a particularly small gap between the conveyor belt and the discharge end can be obtained.

It would be conceivable that a first distance of the middle section, measured in the discharge direction, from the section of the discharge end on the upstream side is smaller than a second distance of the middle section, measured in the discharge direction, from the section of the discharge end on the downstream side. As a result, a drop height difference between different portions of the quantity of dough can be compensated for in a particularly effective manner. With such a configuration, quantities of dough can additionally be deposited such that they overlap particularly well, and a continuous strip of dough can be produced therefrom.

It can be advantageous to have a difference between the first distance and the second distance be set based on a thickness of the quantity of dough discharged and lying on the middle section. It can be particularly advantageous to have a difference between the first distance and the second distance correspond substantially to a thickness of the quantity of dough discharged and lying on the middle section. As a result, drop height differences between the various sections of the quantity of dough along the conveying direction can be kept as small as possible and the quantity of dough can then be deposited very uniformly, even if it overlaps with a quantity of dough previously deposited.

It can be expedient to have the lateral sections of the conveyor belt be foldable from an initial position to an end position and the dough portioning device be configured such that the lateral sections are bent/folded along the discharge length of the discharge end from the initial position to the end position. This can be the case, for example, when the folding/bending of the lateral sections is initiated at the section of the discharge end on the upstream side. In this manner, the distance of the middle section of the conveyor belt from the discharge end can be further minimized, since the distance between the middle section and the discharge end is influenced substantially by the vertical extension of the lateral sections of the conveyor belt. This is still relatively small where the folding/bending is initiated. The middle section can therefore be arranged particularly close to the discharge end at this point.

BRIEF DESCRIPTION OF THE DRAWINGS

The application relates to a dough portioning device of the type described above. In the following, an advantageous embodiment of the disclosure shall be illustrated by way of example in detail using drawings.

DETAILED DESCRIPTION

Figure 1:
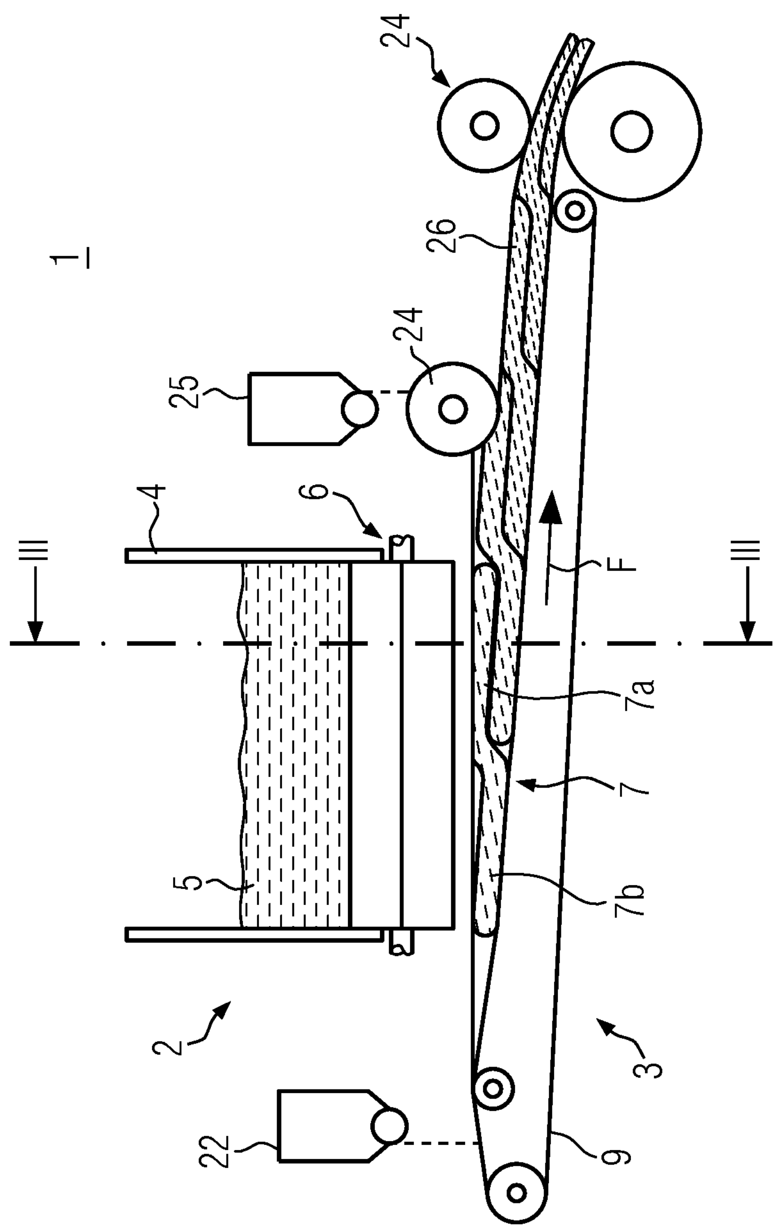
FIG. 1 shows a schematic lateral sectional view of a dough portioning device, where the sectional plane is oriented parallel to the conveying direction.

FIG. 1 shows a perspective sectional side view of a dough portioning device 1. Dough portioning device 1 can comprise a metering device 2. Furthermore, dough portioning device 1 can comprise a conveyor device 3. Conveyor device 3 can be configured to transport dough in a conveying direction F. Metering device 2 can comprise a container 4. Container 4 can be configured to receive a supply 5 of dough. Metering device 2 can also comprise a separator 6 which can be configured to separate a defined quantity 7 of dough from supply 5 of dough. Furthermore, separator 6 can be configured to discharge quantity 7 of dough at a discharge end 8 (see FIG. 2) of metering device 2 in a discharge direction A. Conveyor device 3 can comprise a conveyor belt 9. As can be seen in FIG. 1, conveyor device 3 can be arranged below discharge end 8 of metering device 2.

Figure 2:
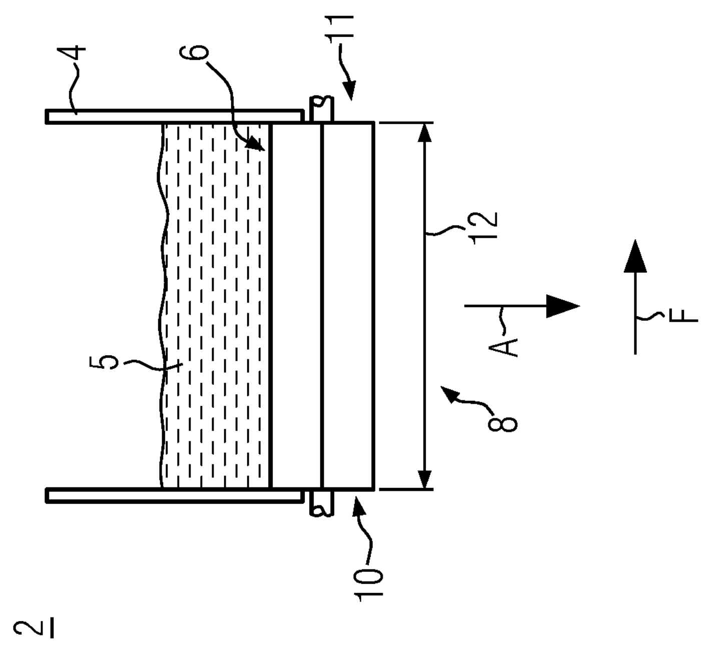
FIG. 2 shows a schematic lateral sectional view of a metering device of the dough portioning device from FIG. 1.

FIG. 2 shows metering device 2 without the other components of dough portioning device 1 in a view similar to that in FIG. 1. It is evident that discharge end 8 can comprise a section 10 on the upstream side. Furthermore, discharge end 8 can comprise a section 11 on the downstream side. Discharge end 8 can extend over a discharge length 12 from section 10 on the upstream side to section 11 on the downstream side. As shown in the present embodiment, discharge end 8 can be oriented to be substantially horizontal. In such a configuration, discharge direction A can be oriented substantially parallel to gravity, which can facilitate discharging quantities 7 of dough.

Figures 3A, 3B, 3C:
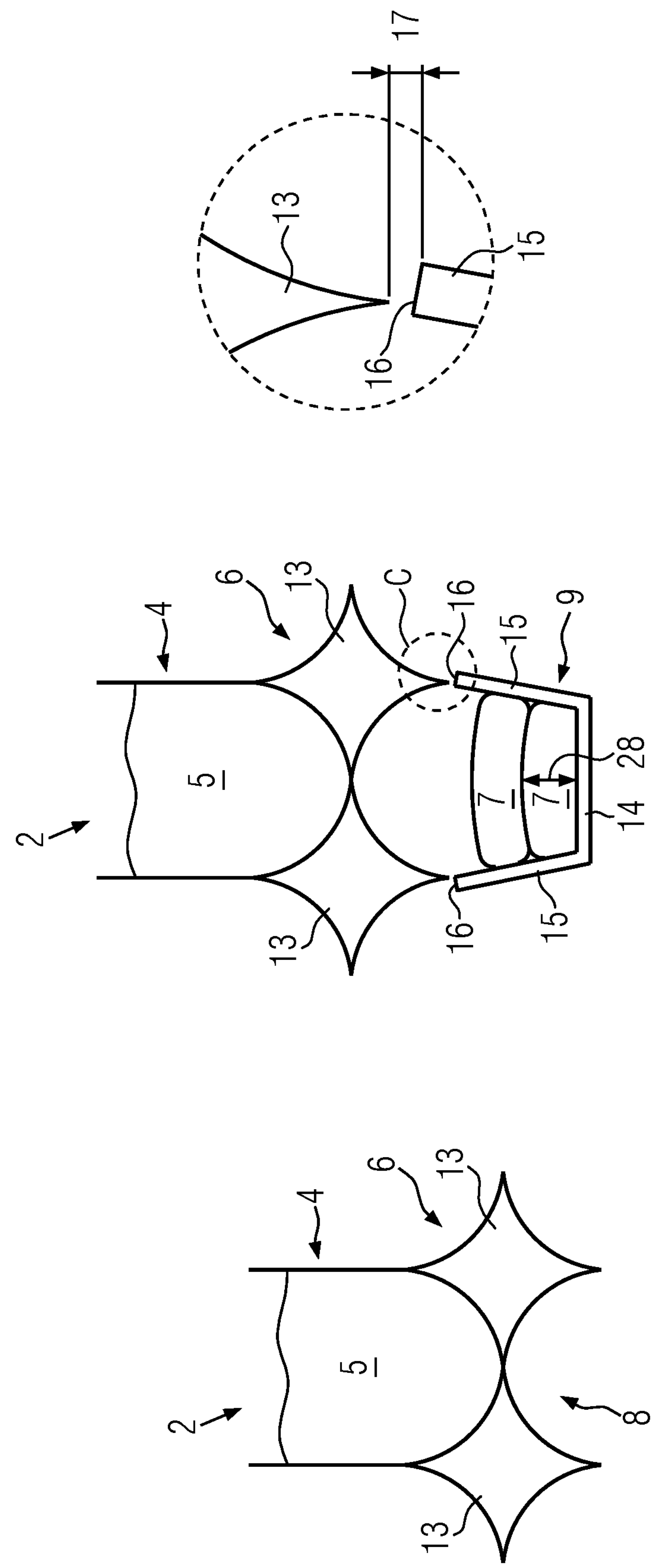
FIG. 3A shows a schematic sectional view of the metering device from FIG. 2, where the sectional plane is oriented to be perpendicular to the conveying direction and the profile of which is indicated in FIG. 1 by line III-III.
FIG. 3B shows the schematic sectional view of the metering device from FIG. 3A, where a conveyor belt with quantities of dough lying thereupon is also shown.
FIG. 3C shows a detailed view of the region indicated by C in FIG. 3B.

FIG. 3 shows metering device 2 in a further sectional view, where the profile of the sectional plane is indicated in FIG. 1 by line III-III. It can now be seen that separator 6 can comprise two star rollers 13. Separator 6 can be configured to separate a defined quantity 7 of dough from supply 5 of dough and to discharge it at discharge end 8 by rotating star rollers 13 in opposite directions. In addition to the illustrations from FIG. 3A, FIG. 3B shows two deposited quantities 7 of dough and conveyor belt 9. Quantities 7 of dough were deposited on conveyor belt 9 in an overlapping manner. Furthermore, it can be seen that conveyor belt 9 can comprise a middle section 14. Furthermore, conveyor belt 9 can comprise two lateral sections 15. Lateral sections 15 can be foldable and/or bendable relative to middle section 14. In particular, lateral sections 15 can be bendable and/or foldable relative to middle section 14 in the direction towards metering device 2. Lateral sections 15 can each have a lateral edge 16. As can be seen in the detailed view in FIG. 3C, lateral edges 16 can be arranged at an edge distance 17 from discharge end 8, in particular from a lower edge of star rollers 13.

Figure 4:
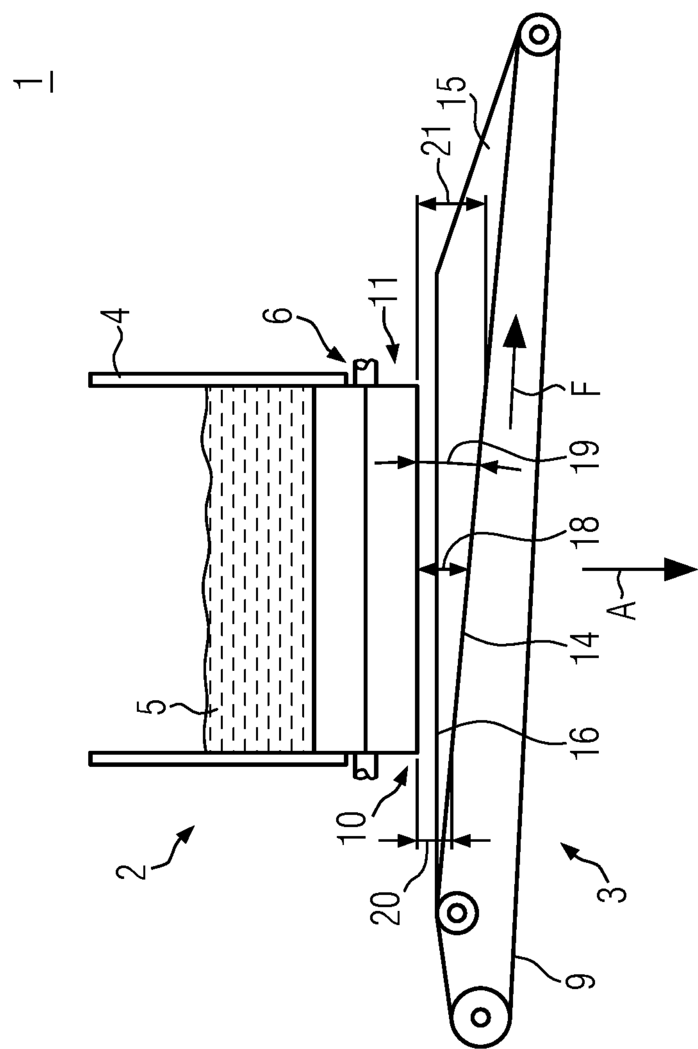
FIG. 4 shows a schematic side sectional view similar to FIG. 1 of the dough portioning device, where various components are hidden for better clarity and no deposited quantities of dough are shown.

FIG. 4 shows dough portioning device 1 in a side sectional view which is similar to the view from FIG. 1. However, only metering device 2 and conveyor device 3 are shown for the sake of clarity. It is evident that middle section 18 can be at a distance from discharge end 8 that can be variable along conveying direction F. Distance 18 can be measured in particular in discharge direction A. Middle section 14 can have a declivity 19 in the region below metering device 2 relative to discharge end 8. In particular, a distance 20 on the upstream side can be smaller than a distance 21 on the downstream side. Distance 20 on the upstream side can be defined in discharge direction A between middle section 14 and section 10 of discharge end 8 on the upstream side. Distance 21 on the downstream side can be defined in discharge direction A between middle section 14 and section 11 of discharge end 8 on the downstream side. It can also be seen in FIG. 4 that edge distance 17 can be substantially constant along discharge length 12. This can be supported in that lateral sections 16 of conveyor belt 9 are continuously bent and/or folded along discharge length 12 of the discharge end in the direction towards the metering device.

Figure 5:
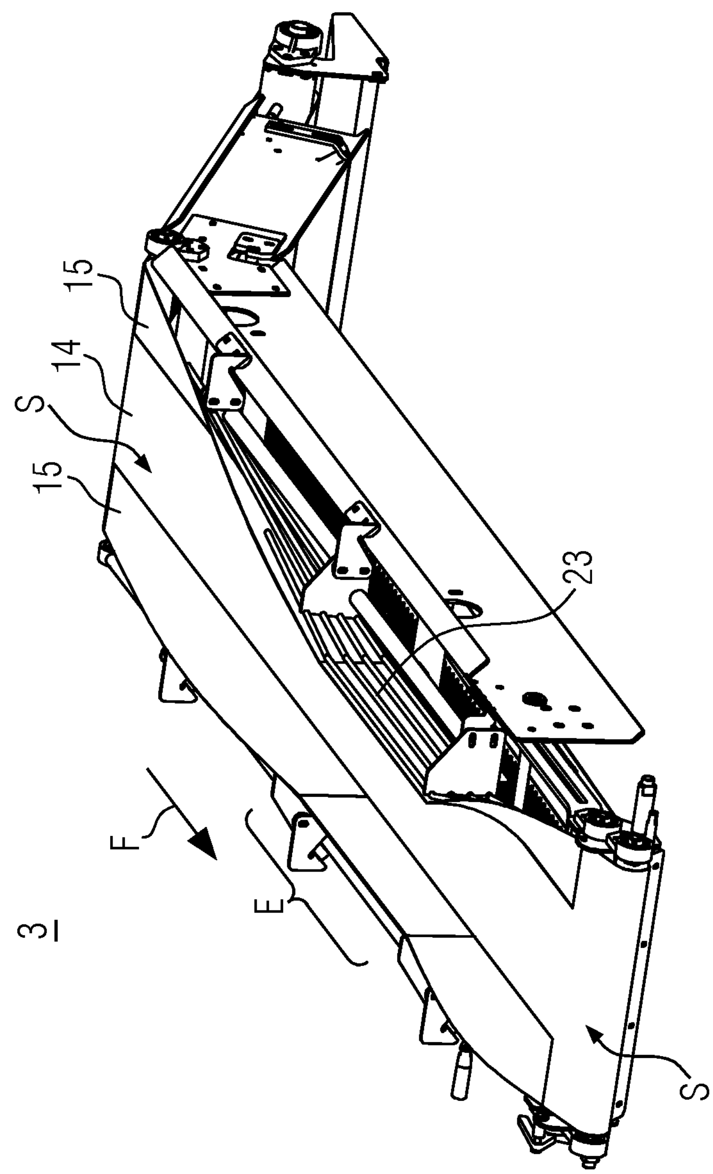
FIG. 5 shows a schematic perspective view of the conveyor device.

A perspective view of conveyor device 3 is shown in FIG. 5. It can now be seen that conveyor device 3 can comprise a belt guide 23. Belt guide 23 can be configured to bend and/or fold lateral sections 15 of conveyor belt 9 relative to middle section 14 in the direction towards metering device 2. Lateral sections 15 can initially be arranged in an initial position S at an end of conveyor device 3 on the upstream side when viewed in conveying direction F. In particular, the lateral sections in initial position S can be oriented substantially parallel to and or coplanar with middle section 14.

Lateral sections 15 can then be bent and/or folded up towards an end position E by engagement of belt guide 23 with an underside of conveyor belt 9, in particular an underside of lateral sections 15. Thereafter, lateral sections 15 can return to initial position S by slacking or absent engagement of belt guide 23 as well as by restoring forces of conveyor belt 9. It is preferred to have the region in which lateral sections 15 are arranged in end position E be arranged downstream of metering device 2. As a result, for example, edge distance 17 can be kept substantially constant.

With reference to FIG. 1, a possible mode of operation of dough portioning device 1 described shall be roughly explained hereafter. A first release agent application device 22 can be arranged in conveying direction F still upstream of metering device 2. Release agent application device 22 can be configured to apply a release agent to conveyor belt 9. This can take place preferably in a region in which lateral sections 15 are still arranged in initial position S. This can facilitate the application of the release agent to lateral sections 15.

In the region of metering device 2, the bending and/or folding of lateral sections 15 can then be started by belt guide 23. In the same region, metering device 2 can discharge a quantity 7 of dough at discharge end 8 of metering device 2 and deposit it on conveyor belt 9. As can be seen in the present embodiment, quantities 7 of dough can be deposited in an overlapping manner, in particular in such a way that each quantity 7 of dough can have an overlapping portion 7*a* and a covered portion 7*b*. A person skilled in the art recognizes that the drop heights of portions 7*a*, 7*b* from metering device 2 would differ if discharge end 8 and conveyor belt 9 were oriented in parallel. In particular, the drop height of an overlapping portion 7*a* onto a covered portion 7*b* of preceding quantity 7 of dough would then be smaller than a drop height of covered portion 7*b* onto conveyor belt 9.

In the presently disclosed dough portioning device, the difference in the drop heights can be compensated for, namely in that middle section 14 has a declivity 19 relative to discharge end 8 of metering device 2. After depositing, the overlapping portions can be pressed by a shaping roller 24 into trough-shaped conveyor belt 9 in order to impart a defined shape upon the resulting strip of dough. A release agent can be applied to shaping roller 24 by a second release agent application device 25. Thereafter, lateral sections 15 can be folded back to the initial position by restoring forces of conveyor belt 9 and the resulting strip 26 of dough can be transferred to a roller system 27.

It is particularly favorable to have the difference between distance 20 on the upstream side and distance 21 on the downstream side be set based on an expected thickness 28 of quantity 7 of dough. Particularly preferably, the difference between distance 20 on the upstream side and distance 21 on the downstream side can correspond substantially to thickness 28 of quantity 7 of dough.

What is claimed is:

1. A dough portioning device comprising:

a metering device with a container which is configured to receive a supply of dough, and a separator which is configured to separate a defined quantity of dough from the supply of dough and to discharge the quantity of dough at a discharge end of the metering device in a discharge direction; and a conveyor device which is configured to transport dough in a conveying direction, wherein the conveyor device comprises a conveyor belt arranged below the discharge end of the metering device, wherein the discharge end extends in the conveying direction over a discharge length from a section of the discharge end on an upstream side to a section of the discharge end on a downstream side, wherein the conveyor device further comprises a belt guide which is configured to bend lateral sections of the conveyor belt relative to a middle section of the conveyor belt in a direction towards the metering device, wherein the middle section of the conveyor belt has a declivity relative to the discharge end of the metering device, at least in a portion of the middle section in a region of the metering device, and wherein, when the lateral sections of the conveyor belt are bent by the belt guide, lateral edges of the lateral sections of the conveyor belt each have an edge distance from the discharge end of the metering device that is measured in the discharge direction and is substantially constant along the portion of the middle section in the conveying direction so that the lateral edges of the lateral sections of the conveyor belt are oriented parallel to the discharge end along the portion of the middle section.

2. The dough portioning device according to claim 1, wherein the discharge end is oriented to be substantially horizontal.

3. The dough portioning device according to claim 1, wherein the middle section has a distance from the discharge end which, when measured in the discharge direction, is variable along the conveying direction.

4. The dough portioning device according to claim 1, wherein an upstream distance of the middle section of the conveyor belt, measured in the discharge direction, from the section of the discharge end on the upstream side is smaller than a distance of the middle section, measured in the discharge direction, from the section of the discharge end on the downstream side.

5. The dough portioning device according to claim 4, wherein a difference between the distance on the upstream side and the distance on the downstream side is set based on a thickness of the quantity of dough discharged and lying on the middle section.

6. The dough portioning device according to claim 4, wherein a difference between the distance on the upstream side and the distance on the downstream side corresponds substantially to a thickness of the quantity of dough discharged and lying on the middle section.

7. The dough portioning device according to claim 1, wherein the lateral sections of the conveyor belt are bendable from an initial position to an end position, and the dough portioning device is configured such that the lateral sections are bent along the discharge length of the discharge end from the initial position to the end position.

8. The dough portioning device according to claim 2, wherein the middle section has a distance from the discharge end which, when measured in the discharge direction, is variable along the conveying direction.

9. The dough portioning device according to claim 2, wherein an upstream distance of the middle section of the conveyor belt, measured in the discharge direction, from the section of the discharge end on the upstream side is smaller than a distance of the middle section, measured in the discharge direction, from the section of the discharge end on the downstream side.

10. The dough portioning device according to claim 3, wherein an upstream distance of the middle section of the conveyor belt, measured in the discharge direction, from the section of the discharge end on the upstream side is smaller than a distance of the middle section, measured in the discharge direction, from the section of the discharge end on the downstream side.

11. The dough portioning device according to claim 5, wherein a difference between the distance on the upstream side and the distance on the downstream side corresponds substantially to a thickness of the quantity of dough discharged and lying on the middle section.

12. The dough portioning device according to claim 2, wherein the lateral sections of the conveyor belt are bendable from an initial position to an end position, and the dough portioning device is configured such that the lateral sections are bent along the discharge length of the discharge end from the initial position to the end position.

13. The dough portioning device according to claim 3, wherein the lateral sections of the conveyor belt are bendable from an initial position to an end position, and the dough portioning device is configured such that the lateral sections are bent along the discharge length of the discharge end from the initial position to the end position.

14. The dough portioning device according to claim 4, wherein the lateral sections of the conveyor belt are bendable from an initial position to an end position, and the dough portioning device is configured such that the lateral sections are bent along the discharge length of the discharge end from the initial position to the end position.

15. The dough portioning device according to claim 5, wherein the lateral sections of the conveyor belt are bendable from an initial position to an end position, and the dough portioning device is configured such that the lateral sections are bent along the discharge length of the discharge end from the initial position to the end position.

16. The dough portioning device according to claim 6, wherein the lateral sections of the conveyor belt are bendable from an initial position to an end position, and the dough portioning device is configured such that the lateral sections are bent along the discharge length of the discharge end from the initial position to the end position.

17. The dough portioning device according to claim 1, wherein the separator comprises two rotatable star rollers that each have four edges configured to separate defined quantities of dough from the supply of dough.

18. The dough portioning device according to claim 1, wherein, when the lateral sections of the conveyor belt are bent by the belt guide, the lateral sections and the middle section form a trough-shaped portion of the conveyor belt, and wherein the dough portioning device further comprises a shaping roller configured to press overlapping portions of dough while the overlapping portions of dough are received in the trough-shaped portion of the conveyor belt.

19. A dough portioning device comprising:

a metering device comprising a container configured to receive a supply of dough, and a separator configured to separate a quantity of dough from the supply of dough and to discharge the quantity of dough at a discharge end of the metering device in a discharge direction; and a conveyor device configured to transport dough in a conveying direction, the conveyor device comprising a conveyor belt configured to receive the quantity of dough discharged by the metering device;

wherein the discharge end of the metering device extends in the conveying direction over a discharge length, the conveyor device further comprises a belt guide configured to bend lateral sections of the conveyor belt relative to a middle section of the conveyor belt in a direction towards the metering device, at least a portion of the middle section of the conveyor belt has a declivity relative to the discharge end of the metering device in a region of the metering device, and, upon the lateral sections of the conveyor belt being bent by the belt guide, lateral edges of the lateral sections of the conveyor belt each have an edge distance from the discharge end of the metering device that is measured in the discharge direction and is substantially constant along the at least a portion of the middle section of the conveyor belt and along the discharge length of the metering device so that the lateral edges of the lateral sections of the conveyor belt are oriented parallel to the discharge end along the at least a portion of the middle section.

20. The dough portioning device according to claim 19, wherein the middle section has a distance from the discharge end which, when measured in the discharge direction, is variable along the discharge length in the conveying direction.

21. The dough portioning device according to claim 1, wherein the middle section of the conveyor belt has a declivity relative to the discharge end of the metering device along an entirety of the discharge length, and, wherein, for each lateral section of the conveyor belt, the edge distance is substantially constant along the entirety of the discharge length.

22. The dough portioning device according to claim 19, wherein, the lateral edges of the lateral sections of the conveyor belt are oriented parallel to the discharge end along an entirety of the discharge end.

23. The dough portioning device according to claim 22, wherein the middle section of the conveyor belt has a declivity relative to the discharge end of the metering device along the entirety of the discharge length.

* * * * *